UNITED STATES PATENT OFFICE.

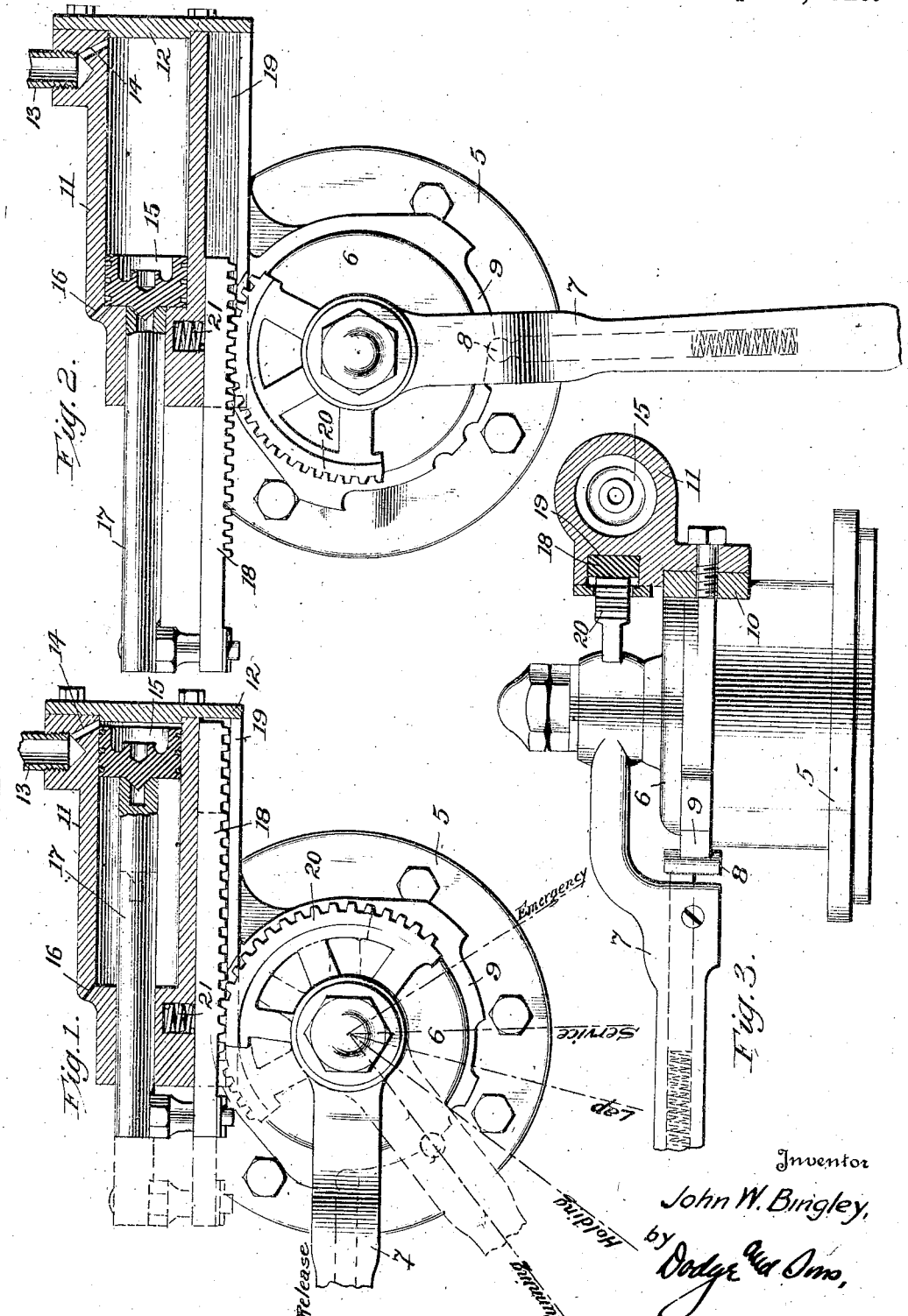

JOHN W. BINGLEY, OF WATERTOWN, NEW YORK.

ENGINEER'S BRAKE-VALVE.

1,353,375.  Specification of Letters Patent.  Patented Sept. 21, 1920.

Application filed November 22, 1916. Serial No. 132,873.

*To all whom it may concern:*

Be it known that I, JOHN W. BINGLEY, a citizen of the United States, residing at Watertown, in the county of Jefferson and State of New York, have invented certain new and useful Improvements in Engineers' Brake-Valves, of which the following is a specification.

This invention relates to air brakes and particularly to engineer's brake valves.

The object of the invention is to provide an improved type of valve equipped with a pressure motor so related to the rotary valve forming a part of the usual engineer's brake valve as to move said rotary valve to service application position, and then leave it free to be moved to emergency position by hand. Another feature of the invention is the complete freedom of the engineer's valve from said pressure motor when the latter is not actuated.

The device is particularly adapted for use in safety stop mechanisms and is claimed in combination with such a system in my copending application, Serial No. 132,872 filed November 22, 1916. The claims of the present application are acordingly restricted to the valve and motor construction.

In the drawings, which illustrate a preferred embodiment of the invention:—

Figure 1 is a plan view of an engineer's valve with the motor shown in longitudinal axial section, the valve being in release position;

Fig. 2 is a similar view showing the valve moved to service application position by the motor, and Fig. 3 is an elevation of the valve with the motor shown in transverse section.

The invention is intended primarily for use with valves of the equalizing discharge type, having the usual functions corresponding to "release," "running," "holding," "lap," "service" and "emergency" positions, but is not confined thereto. A valve of this type is indicated generally in the drawings, but as the details of its internal construction are familiar and subject to considerable variation they are not illustrated.

A part of the valve casing is illustrated at 5, the cap at 6, the handle at 7, the handle detent at 8 and the notched detent sector at 9. The cap 6 carries a boss 10 to which is bolted a horizontal cylinder 11. This has a head 12, and a tapped connection for the pressure fluid pipe 13 leading to a head-end port 14.

A piston 15 is slidably mounted in the cylinder 11 and makes a reasonably close fit therein. A slight leakage around the piston is usually provided for, less than the capacity of the port 14, so that pressure will be relieved behind piston 15 when the supply to port 14 is cut off, without the provision of a special exhaust valve. A vent port 16 vents such leakage and relieves all pressure opposition to the motion of the piston away from the head end.

The piston abuts against, but is not connected to a rod 17 slidably mounted in the end of cylinder 11, and this rod carries a rack 18 which is guided in a guide way 19 formed in the side of cylinder 11 so as to have a longitudinal sliding movement. The rack 18 meshes with a sector gear 20 formed on the handle 7. A thrust spring 21 is provided to take up lost motion and insure a close meshing of the rack and gear.

The handle 7 operates the usual rotary valve, forming a part of the engineer's valve and commonly would have six positions, indicated on Fig. 1, and there designated as "release," "running," "holding," "lap," "service" and "emergency." The functions of the valve in these various positions are well understood, and obviously my invention may be used with valves having more or fewer positions, such valves being also familiar in this art.

When pressure is admitted behind piston 15 this will be forced forward to the limit of its travel. This moves the rod 17 and rack 18 outward and by rotating the gear 20 moves the valve to service position, the parts being so designed that the piston 15 will have completed its travel when the valve has moved this far. The valve is then free to be moved manually to emergency position. After pressure has been released from cylinder 11 the handle 7 may be moved to release position. This restores the piston 15 to the inner end of its travel leaving the handle 7 free for manual operation throughout its entire range.

The device is available for use in a wide range of safety stop mechanisms and is subject to modification to suit particular conditions. In some cases the motor and its connections might be differently proportioned with reference to the valve so as to move the latter through its entire travel or any desired part thereof. Particular advantage, however, resides in the feature of moving the valve to service application position and then leaving it free to be moved by hand to emergency position, movement in the reverse direction, past service position being at the same time precluded. Such action produces a relatively quick stop, and does not interfere with emergency applications. The direct actuation of the engineer's valve by a safety stop mechanism precludes any counteraction of the stop mechanism through manipulation of the engineer's valve.

Having thus described my invention what I claim is:—

1. The combination of an engineer's brake valve; a pressure cylinder; means for conducting and releasing pressure to and from said cylinder; a free piston in said cylinder; and a rod connected with said valve and capable of being moved by said piston in one direction only.

2. The combination of an engineer's brake valve; a pressure cylinder; means for conducting and releasing pressure to and from said cylinder; a free piston in said cylinder; and a rod adapted to be engaged and moved by said piston and geared to said valve.

3. The combination of an engineer's brake valve having a casing; a pressure cylinder mounted on said casing; a free piston in said cylinder; a rod guided in one end of said cylinder and adapted to be engaged and moved by said piston; a rack connected to the end of said rod and guided on the outside of said cylinder; and a gear carried by a part of the engineer's valve mechanism and meshing with said rack.

4. The combination of an engineer's brake valve having a casing formed with a removable cap; a valve actuating motor mounted on and supported solely by said cap; and operative connections between said motor and valve.

5. The combination of an engineer's brake valve having a casing formed with a removable cap, and having an operating handle; a valve actuating motor mounted on and supported by said cap; and a gear mounted on said handle and serving as an operative connection between said motor and valve.

6. The combination of an engineer's brake valve having a casing formed with a removable cap, said valve having an actuating handle; a pressure cylinder mounted on said cap; a free piston in said cylinder; a rod guided in said cylinder and adapted to be engaged and moved by said piston; a rack carried by said rod; and a gear carried by said handle and meshing with said rack.

In testimony whereof I have signed my name to this specification.

JOHN W. BINGLEY.